United States Patent [19]

Willmann

[11] Patent Number: 5,123,717
[45] Date of Patent: Jun. 23, 1992

[54] BRAKE SYSTEM

[75] Inventor: Karl-Heinz Willmann, Freiberg, Fed. Rep. of Germany

[73] Assignee: Robert Bosch GmbH, Stuttgart, Fed. Rep. of Germany

[21] Appl. No.: 568,820

[22] Filed: Aug. 17, 1990

[30] Foreign Application Priority Data

Oct. 10, 1989 [DE] Fed. Rep. of Germany ....... 3933797

[51] Int. Cl.$^5$ .................................................. B60F 8/38
[52] U.S. Cl. .......................... 303/113.55; 303/115 PP; 303/116 R
[58] Field of Search ............... 303/113, 114, 115, 116, 303/119, DIG. 1, DIG. 2, DIG. 3, 113.55, 113 R, 114 R, 115 PP

[56] References Cited

U.S. PATENT DOCUMENTS

| 3,827,759 | 8/1974 | Belart | 303/113 R |
|---|---|---|---|
| 4,346,943 | 8/1982 | Leiber | 303/114 |
| 4,462,642 | 7/1984 | Leiber | 303/119 P |
| 4,645,272 | 2/1987 | Leiber | 303/113 |
| 4,678,243 | 7/1987 | Leiber | 303/114 R |
| 4,687,259 | 8/1987 | Reimartz et al. | 303/114 |
| 4,715,661 | 12/1987 | Leiber | 303/114 X |
| 4,741,581 | 5/1988 | Krohn | 303/115 |
| 4,758,054 | 7/1988 | Brown | 303/119 |
| 4,846,534 | 7/1984 | Leiber et al. | 303/115 |
| 4,890,891 | 1/1990 | Leiber | 303/115 |

FOREIGN PATENT DOCUMENTS

| 0231113 | 8/1987 | European Pat. Off. | 303/DIG. 3 |
|---|---|---|---|
| 0268076 | 5/1988 | European Pat. Off. | 303/115 |
| 0114565 | 5/1987 | Japan | 303/115 |

Primary Examiner—Matthew C. Graham
Attorney, Agent, or Firm—Edwin E. Greigg; Ronald E. Greigg

[57] ABSTRACT

In a brake system having a master brake cylinder, in which at least one brake piston, which can be acted upon with brake pressure by a piston rod, forms a brake chamber from which a brake line leads to wheel brake cylinders, at least one valve is incorporated into the brake line for blocking the brake line upon anti-skid control, and at least one pressure chamber, formed by an additional piston, of an additional plunger for feeding brake fluid via a line communicates with the brake line. From the brake line upstream of the valve, a return line for the brake fluid upon anti-skid control leads to the brake chamber of the additional plunger. A valve, in particular a 2/2-way valve, is incorporated into the return line.

18 Claims, 4 Drawing Sheets

1

BRAKE SYSTEM

BACKGROUND OF THE INVENTION

The invention relates to a brake system as defined hereinafter.

This kind of brake system, in which the brake boosting occurs only or additionally outside the actual master brake cylinder, is described in U.S. Pat. No. 4,678,243, for instance. In that patent, by means of an additional plunger included in a brake circuit, an additional brake pressure can be exerted upon wheel brake cylinders. The pressure buildup in the additional plunger is effected independently of a brake pressure that acts upon a brake pedal. The control is effected via a travel sensor, associated with a piston in the brake booster, and via a pressure sensor associated with the additional plunger. Thus this additional plunger has the sole task of raising the brake pressure in the brake circuit independently of the brake pressure acting on the brake pedal.

OBJECT AND SUMMARY OF THE INVENTION

In accordance with the present invention however, not only is brake fluid fed into the brake line by means of the additional plunger, but the additional plunger also serves above all to return the brake fluid during anti-skid control operation. For this reason, the pressure chamber embodied in the additional plunger by the additional piston additionally communicates via a return line with the brake line upstream of the valves that effect the anti-skid control. In the case of anti-skid control, this additional plunger receives a large proportion of the brake fluid volume to be returned, making this volume immediately available again for subsequent brake operation.

A valve is also intended to be incorporated into the return line between the pressure chamber and the brake line. A 2/2-way magnetic valve which in the case of anti-skid control jumps from a closed position to an opened position is suitable here. This opens up the path for the brake fluid to flow back into the pressure chamber of the additional plunger.

In one exemplary embodiment, a check valve is also intended to be provided in the line for feeding brake fluid from the brake chamber into the brake line. This check valve has the sole task of preventing an additional pressure increase by the additional plunger when the brake pressure in the brake line is high.

In a preferred embodiment of the invention, however, the check valve is replaced by a reversible valve, in particular a 2/2-way magnetic valve. On the one hand, during the maintenance and buildup phase in anti-skid control, this valve can perform the task of opening the brake chamber of the additional plunger toward the brake chamber of the master brake cylinder, so that a return of the brake piston in the master brake cylinder takes place. Furthermore, these valves in the line between the pressure chamber of the additional plunger and the brake chamber can also perform traction control. For instance, if a wheel sensor ascertains a loss of traction at one wheel, then the applicable valve switches over to the open position, so that brake fluid under pressure flows out of the pressure chamber of the additional plunger into the corresponding brake line and from there is carried to the wheel brake cylinder.

In one embodiment of the invention, the actuation of the additional piston in the additional plunger, or in other words the buildup of pressure in the pressure chamber of the additional plunger, is effected mechanically via a rod or the like. This is intended for example so that a rack will act upon the face end of the additional plunger; the rack is moved via a gear wheel driven by an electric motor.

In another embodiment of the invention, however, a pressure chamber is provided upstream of the additional piston of the additional plunger, and pressure fluid can be fed into this chamber by means of a pump via a feed line. In a simple embodiment of the invention, this is intended so that the pump will be actuated by a suitable control unit only if a pressure buildup in the pressure chamber of the additional plunger is in fact required.

In another embodiment of the invention, however, a valve for supplying the pressure chamber is disposed in the line between the pump and the pressure chamber, and a valve for relieving the pressure chamber is disposed between a supply container and the pressure chamber. This arrangement makes it possible for a pressure to be built up in a reservoir upstream of the feed valve by means of the pump; upon switchover of the feed valve, this pressure can be immediately utilized for filling the pressure chamber upstream of the additional piston in the additional plunger. In this arrangement, a suitable pressure limiting valve should naturally lead back to the supply container, to prevent damage to the reservoir or the valve if the pump is overly powerful.

In another preferred embodiment of the invention, the control of the drive of the rod or pump and valves is effected electronically, via a control unit. The control unit receives values from travel sensors that are associated with the piston rod on the one hand and the additional piston in the additional plunger, on the other, by way of example. The control unit can compare the values of the two travel sensors and enables followup of the additional piston by building up pressure in the pressure chamber upstream of the additional piston.

In another exemplary embodiment of the invention, the intent is to couple the additional piston to the piston rod mechanically via suitable connections, and a displacement of the piston rod causes opening of the valves, by means of which the additional piston is followed up because of the buildup in pressure in the pressure chamber. A suitable valve might be a 3/3-way valve.

In the embodiments in which a pressure is built up in the pressure chamber upstream of the additional piston by means of a pressure fluid, then it is also suitable for this pressure chamber to communicate via an equalization line with a pressure chamber formed upstream of the brake piston in the master brake cylinder. By way of a valve incorporated into this equalization line, the pressure chamber upstream of the brake piston in the master brake cylinder can likewise be filled with pressure fluid. This makes an additional brake booster provided between the master brake cylinder and brake pedal unnecessary in any case. The other exemplary embodiments also make do without brake boosting in the region between the master brake cylinder and the brake pedal, although depending on practicality a brake booster having a vacuum may offer some slight reinforcement.

A further advantage of the present invention is that the diameter of the master brake cylinder is designed to be extraordinarily small. For instance, if the additional plunger should fail, a high brake pressure at relatively little pedal force can still be achieved.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
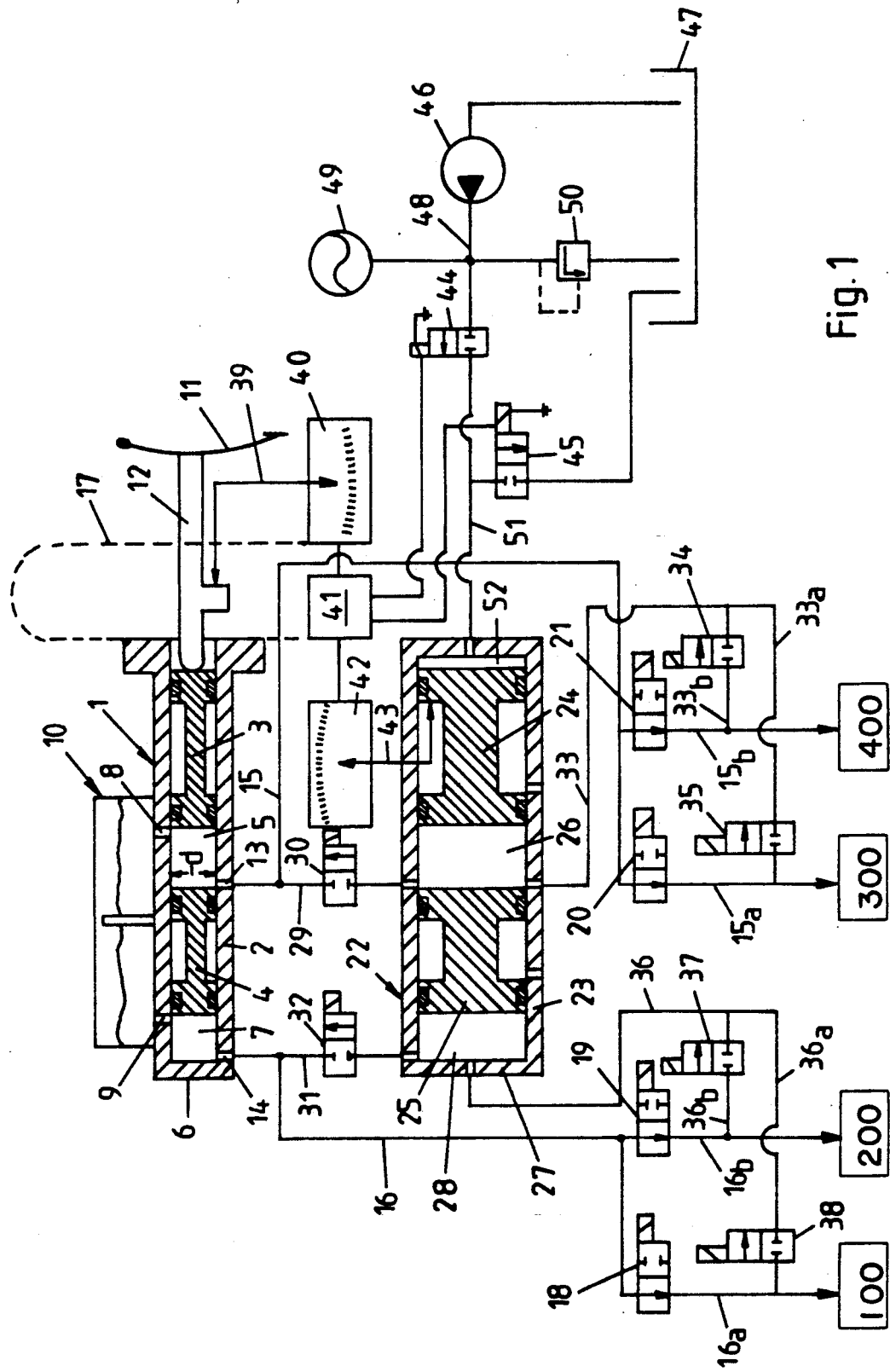
FIG. 1 shows a brake system, partly in longitudinal section and partly in the form of a block circuit diagram.

In FIG. 1, a brake system according to the invention has a master brake cylinder 1, in the housing 2 of which two brake pistons 3 and 4 slide. For the sake of simplicity, elements connecting the two brake pistons 3 and 4 are not shown in further detail.

A first brake chamber 5 is embodied between the brake pistons 3 and 4, and a second brake chamber 7 is formed between the brake piston 4 and the bottom 6 of the housing. Both the brake chamber 5 and the brake chamber 7 each have a respective inlet 8 and 9 for brake fluid from a corresponding supply container 10.

If the brake chambers 5 and 7 are placed under pressure by a brake pressure on a brake pedal 11 via a piston rod 12, which acts on the face end of the brake piston 3, then brake fluid from the brake chambers 5 and 7 is introduced through an outlet 13 and 14, respectively, into brake lines 15 and 16 of two brake circuits. A brake booster 17 is optionally included as well, although it is not absolutely necessary, between the brake pedal 11 and the master brake cylinder 1, as indicated by dashed lines. If a brake booster is used, then it may also be a vacuum brake booster, for example, which provides only slight reinforcement of the brake force. Naturally it is within the scope of the invention to use other brake boosters, with other amounts of energy.

Via the brake line 16, the wheel brake cylinders 100 and 200 are supplied with brake fluid; these wheel brake cylinders 100 and 200 are not shown in further detail for the sake of simplicity.

The brake line 15 likewise takes on the task of supplying wheel brake cylinders 3 and 4. Magnetic valves 18, 19 and 20, 21, respectively, are incorporated in the corresponding branch lines 16a and 16b and 15a and 15b, respectively; these valves essentially take on the task of controlling the brake system in an anti-skid situation. If the anti-skid situation then arises, then the magnetic valves 18, 19, 20 and 21 switch to the closed position, so that no further brake fluid from the brake chambers 5 and 7 can reach the respective wheel brake cylinders 100, 200, 300 and 400.

According to the invention, an additional plunger 22 that has a housing 23 is associated with the master brake cylinder 100. Two additional pistons 24 and 25, which are approximately equivalent to the brake pistons 3 and 4, slide in this housing 23. Once again, they form a pressure chamber 26 between them, and the additional piston 25 together with the housing bottom 27 form a pressure chamber 28.

The pressure chamber 26 has a connecting line 29 to the brake line 15, and a magnetic valve 30 is incorporated into this connecting line 29. A line 31 likewise connects the pressure chamber 28 to the brake line 16, and a magnetic valve 32 is incorporated into this line 31 as well.

The pressure chamber 26 also has a connection to a return line 33 to the brake line 15; this return line 33 likewise splits into the branch lines 33a and 33b, with one magnetic valve 34 and 35 incorporated into each of them.

A return line 36 also leads from the pressure chamber 28 to the brake line 16; the communication with the branch lines 16a and 16b is effected via corresponding branch lines 36a and 36b, into which magnetic valves 37 and 38, respectively, are also incorporated.

This additional plunger has the task above all of increasing the braking action in the wheel brake cylinders 100, 200, 300 and 400 during normal braking operation. According to the exemplary embodiment of FIG. 1, the control of the additional plunger 22 is performed electronically. If a brake pressure is exerted upon the brake pedal 11, thus displacing the piston rod 12, this displacement is reported to a travel sensor 40 via a suitable signal line 39. The travel sensor 40 is connected to the control unit 41, which receives a further signal from a travel sensor 42 that measures the travel of the additional piston 24 via a line 43. In the control unit 41, the two travel values, or the signals corresponding to them, are compared, and two further magnetic valves 44 and 45 are triggered. The magnetic valve 44 communicates via a pump 46 with a supply container 47 for a pressure fluid. Both a reservoir 49 and a pressure equalization valve 50 are incorporated into the line 48 between the pump 46 and the magnetic valve 44. The pressure equalization valve 50 likewise discharges into the supply container 47.

When a normal braking situation occurs, the travel of the piston rod 12 is fed via the travel sensor to the control unit, and the control unit ascertains a difference from the signal value of the travel sensor 42. The result is a switchover of the magnetic valve 44 into the open position, so that via the supply container 47 or from the reservoir 49, pressure fluid can be introduced via a feed line 51 into a pressure chamber 52 upstream of the additional piston 24. The result is a pressure increase in the pressure chambers 26 and 28, so that pressure fluid or brake fluid located in them can flow via the lines 29 and 31 and the corresponding open magnetic valves 30, 32 to the respective brake lines 15, 16.

This is in addition to the brake fluid from the brake chambers 5 and 7.

If an anti-skid situation arises, then the magnetic valves 18, 19; 20, 21; and 30, 32 switch over to the closed position, so that the brake lines 15 and 16 are closed. Contrarily, the magnetic valves 34, 35 and 37, 38 open, so that brake fluid is returned from the wheel brake cylinders via the return lines 33 and 36 to the respective pressure chambers 26 and 28. Since the primary volume of brake fluid is drawn from the additional plunger 22 each time braking is performed, as long as the supply of brake fluid is intact, then in the anti-skid situation as well the relief takes place via this additional plunger 22, which again receives a large proportion of the brake fluid from the wheel brake cylinders. A return of the additional piston 24 or 25 is effected essentially by a relief of the pressure chamber 52, and the pressure fluid present in it flows back to the supply container 47 via the feed line 51 and the valve 45.

According to the invention, the magnetic valves 30 and 32 are also switched over to the open position in the pressure decrease phase of the anti-skid control, so that brake fluid can be carried back into the brake chambers 5 and 7 via the connecting line 29 and the line 31. This effects a return of the brake pistons 3 and 4 counter to the piston rod 12, or counter to a possible brake pressure upon the brake pedal 11 which may still be present. Thus still larger volumes of brake fluid can be received from the wheel brake cylinders.

Traction control is effected in a simple fashion via the magnetic valves 30 and 32, by actuation of the additional plunger 22. A loss of traction is ascertained via suitable wheel sensors and reported to the control unit 41. The control unit opens the magnetic valve 44, whereupon the pump 46 fills the additional plunger 22 or the pressure chamber 52 with pressure fluid. Via the opened magnetic valves 30 and 32, brake fluid flows from the pressure chambers 26 and 28 into the brake lines 15 and 16.

As long as the anti-skid system is in working order, it is possible for the rear axle to be braked more strongly than the front axle. For the sake of attaining this variable brake adaptation, the pressure reduction magnetic valves of one axle are embodied to be closed when without current. In that case a differential pressure switch is necessary, to enable recognition of, and reaction to, any possible failure of a brake circuit.

In the present exemplary embodiments, a diameter d of the master brake cylinder is selected to be so small that if the brake boosting fails, a high brake pressure can still be attained by the additional plunger 22 despite a low pressure on the brake pedal 11. In that case the step-up provided is relatively slight.

Figure 2:
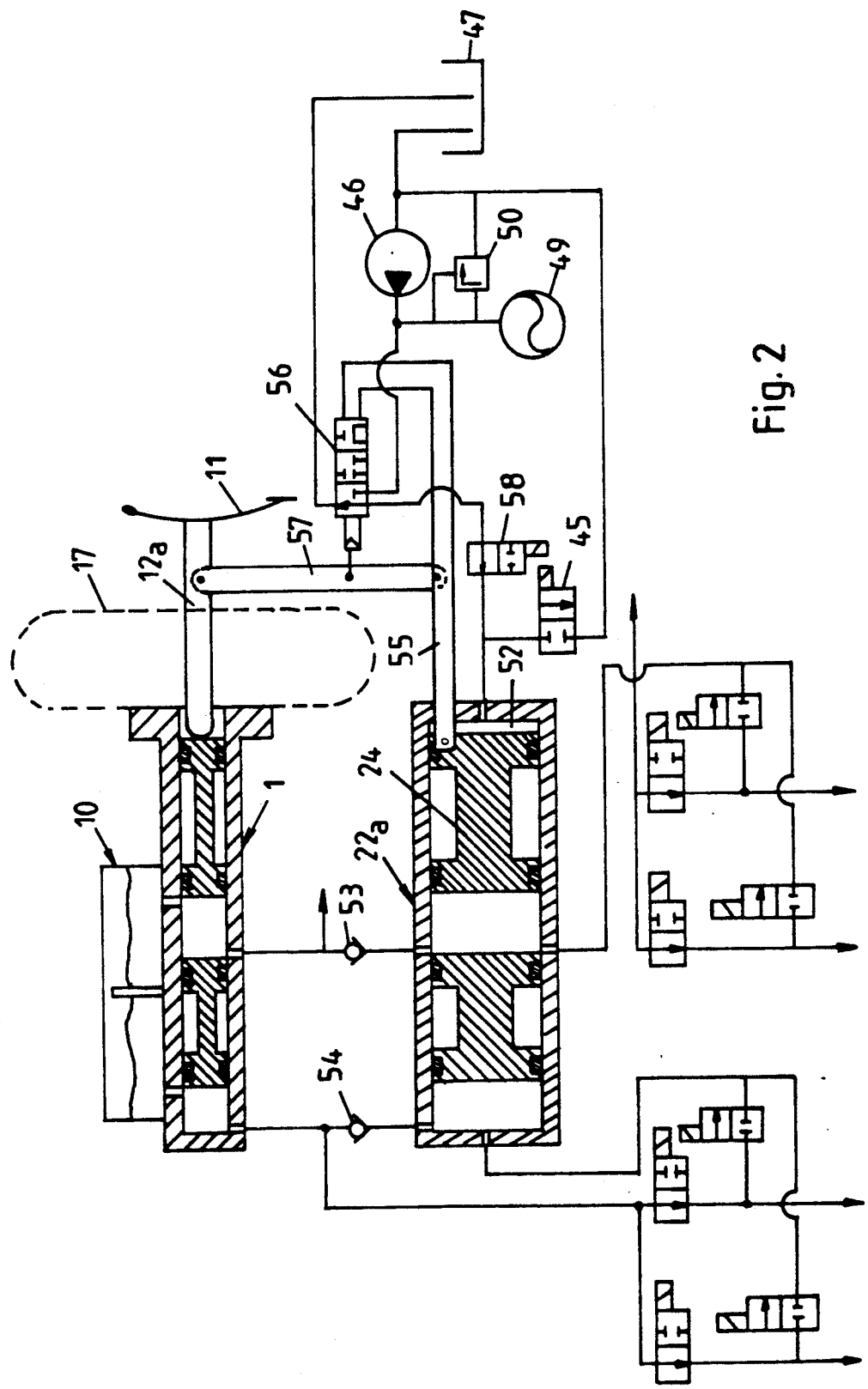
FIG. 2 for a further embodiment of a brake system of FIG. 1 shows a brake system, partly in longitudinal section and partly in the form of a block circuit diagram.

If traction control should not be necessary, it has proved advisable to replace the magnetic valves 30 and 32 with corresponding check valves 53 and 54, as shown particularly in FIG. 2. The control of the additional plunger 22a is also effected there not electronically but mechanically. To this end, a thrust rod 55 that mechanically actuates a valve 56 is pivotably connected to the additional piston 24. This valve 56 is also coupled to a connecting rod 57 that connects the piston rod 12a to the thrust rod 55.

In the position shown in FIG. 2, pressure fluid from the pressure chamber 52 downstream of the additional piston 24 can flow back to the supply container 47 via a magnetic valve 58 and the opened valve 56. If the valve 56 is moved into its middle position, then this return flow to the supply container 47 stops. In the third position of the valve 56, finally, the pressure chamber 52 communicates with the pump 46 or optionally with the reservoir 49, so that once again a pressure buildup can take place in the pressure chamber 52, via a pressure fluid from the supply container 47.

The other elements of this embodiment are equivalent to those of FIG. 1.

Figure 3:
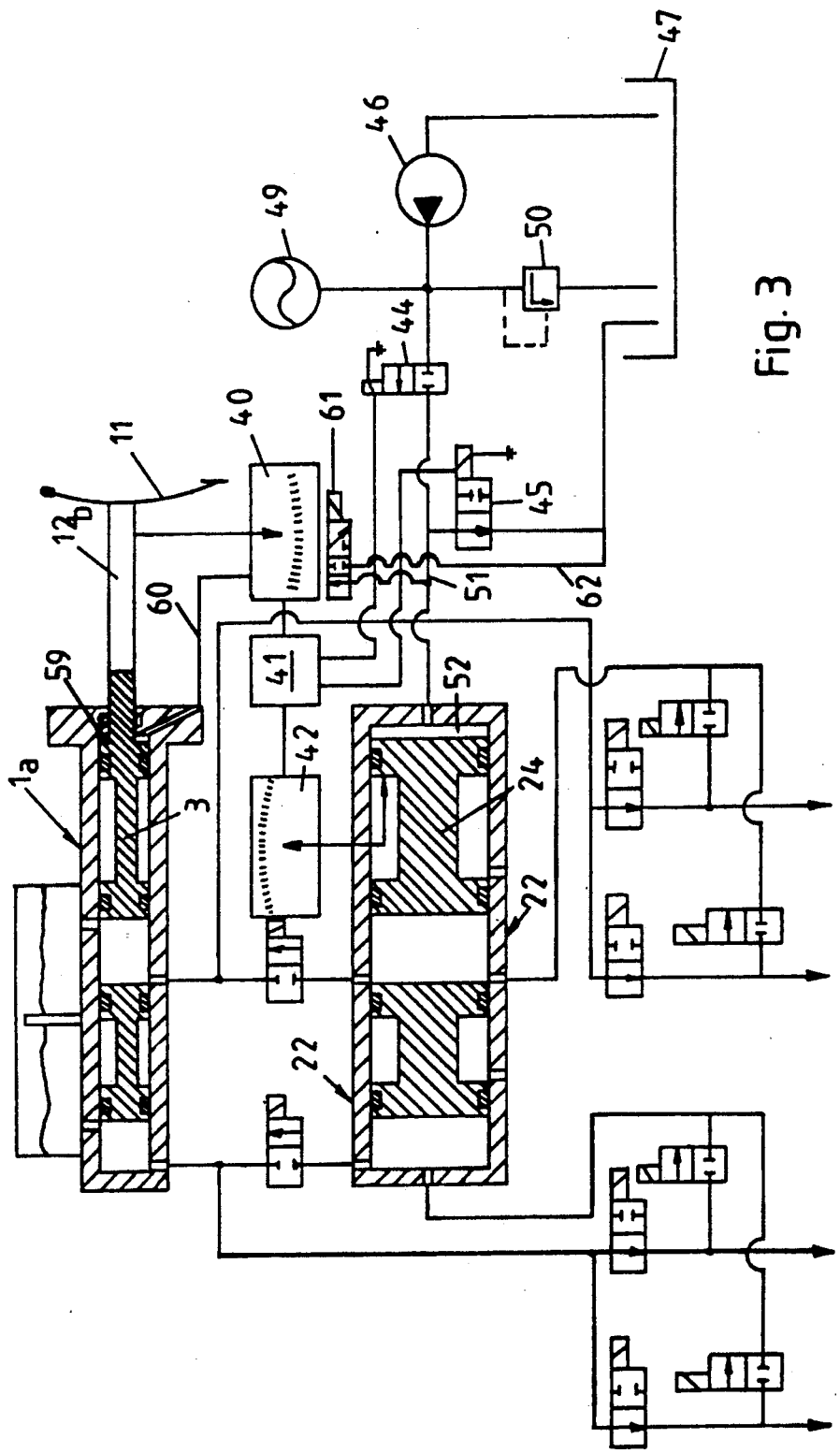
FIG. 3 for a further embodiment of a brake system shows a brake system, partly in longitudinal section and partly in the form of a block circuit diagram.

FIG. 3 shows an exemplary embodiment of the invention in which a brake booster between the brake pedal 11 and the master brake cylinder 1a can be dispensed with entirely. To this end, a pressure chamber 59 downstream of the first brake piston 3 and the pressure chamber 52 downstream of the additional piston 24 in the additional plunger 22 communicate with one another via an equalization line 60. Incorporated into the equalization line 60 upstream of its connection to the feed line 51 is a magnetic valve 61, which in the position shown assures that the pressure chamber 59 will be filled to the same extent as the pressure chamber 52.

The second position of the valve is a blocking position, while in the third position of the valve the pressure chamber 59 can be relieved via a line 62 into the supply container 47. This occurs whenever upon anti-skid control with the aid of the additional plunger 22, a return of the brake pistons 3 and 4 in the master brake cylinder 1a takes place.

In the exemplary embodiment shown, the piston rod 12b is also rigidly connected to the brake piston 3. The other elements of the brake system are equivalent to those of FIG. 1.

Figure 4:
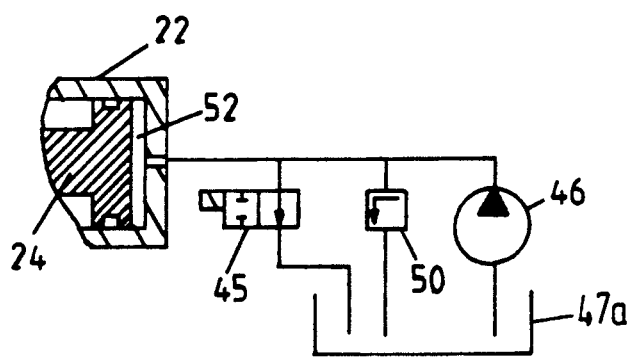
FIG. 4 shows a detail of a brake system of FIGS. 1–3.

In FIG. 4, for the sake of completeness, it is also shown that both an additional reservoir 47a and in exceptional cases the magnetic valve 45 can be dispensed with. This applies whenever the tandem pump of the power steering, or a separate pump 46 driven by an electric motor, is used as the pump. Such a pump is set into operation only whenever the pressure chamber 52 downstream of the additional piston 24 is to be filled.

Figure 5:
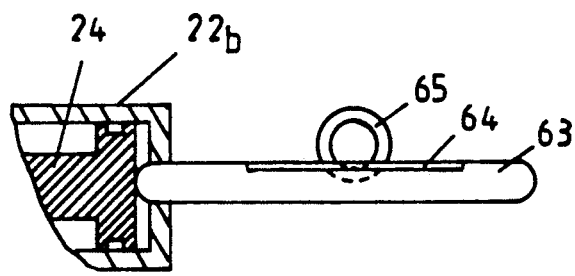
FIG. 5 is a detail of a brake system of FIGS. 1–4 in another embodiment.

In FIG. 5, forward displacement of the additional piston 24 in the additional plunger 22b by mechanical means is also conceivable. Here the additional piston 24 is acted upon by a rack 63, the teeth 64 of which mesh with a gear wheel 65 driven for instance by an electric motor. The control of the electric motor for the gear wheel 65 is effected for instance by the control unit 41 already mentioned in conjunction with FIG. 1.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A brake system comprising a master brake cylinder, in which at least one brake piston in said master brake cylinder forms a brake chamber and is acted upon with brake pressure by a piston rod, for said brake chamber, a brake line leads to wheel brake cylinders, wherein at least one valve for blocking the brake line in an anti-skid control operation is incorporated into the brake line, and communicating with the brake line is at least one pressure chamber, formed by an additional piston (24, 25), of a plunger (22) which is set under pressure for feeding brake fluid via a line, in which the brake line (15, 16) is upstream of the valve (18, 19, 20, 21), and a return line (33, 36) for the brake fluid upon anti-skid control leads to the pressure chamber (26, 28) of the plunger (22), and a control of the additional piston of the plunger (22) is effected electronically via a feedback control unit (41) that compares the values of a first travel sensor (40) associated with the piston rod (12) and a second travel sensor associated with the additional piston.

2. A brake system as defined by claim 1, in which a 2/2-way valve (34, 35, 37, 38) is incorporated into the return line (33, 36).

3. A brake system as defined by claim 2, in which a 2/2-way valve (30, 32) is incorporated into the line (29, 31) for controlling traction, and for feeding brake fluid from the pressure chamber (26, 28).

4. A brake system as defined by claim 2, in which a check valve is incorporated into the line (29, 31) for feeding brake fluid from the pressure chamber (26, 28) into the brake line (15, 16).

5. A brake system as defined by claim 4, in which the additional piston (24) is set under pressure mechanically.

6. A brake system as defined by claim 2, in which the additional piston (24) is set under pressure mechanically.

7. A brake system as defined by claim 6, in which a reservoir (49) discharges into a reservoir line (48) between a reservoir valve (44) and a pump (46), and said reservoir line (48) communicates with a supply container (47) via a pressure limiting valve (50).

8. A brake system as defined by claim 1, in which a check valve is incorporated into the line (29, 31) for feeding brake fluid from the pressure chamber (26, 28) into the brake line (15, 16).

9. A brake system as defined by claim 8, in which the additional piston (24) is set under pressure mechanically.

10. A brake system as defined by claim 1, in which a 2/2-way valve (30, 32) is incorporated into the line (29, 31) for controlling traction, and for feeding brake fluid from the pressure chamber (26, 28).

11. A brake system as defined by claim 1, also comprising a rod which is embodied as a rack (63), the teeth (64) of which are engaged by a gear wheel (65), preferably driven by electric motor.

12. A brake system as defined by claim 1, in which upstream of the additional piston (24) of the plunger (22), an additional pressure chamber (52) is provided into which pressure fluid can be filled by means of a pump (46) via a feed line (51).

13. A brake system as defined by claim 12, in which a 2/2-way valve (44) is incorporated into the feed line (51) between the pump (46) and the additional pressure chamber (52).

14. A brake system as defined by claim 12, in which the control of the pressure fluid supplied to the additional pressure chamber (52) from the pump (46) as well as a reservoir (49) is effected mechanically via a 3/3-way valve (56).

15. A brake system as defined by claim 1, in which the return line branches off from a feed line (51) into a supply container (47) via a valve (45).

16. A brake system comprising a master brake cylinder, in which at least one brake piston in said master brake cylinder forms a brake chamber and is acted upon with brake pressure by a piston rod, from said chamber a brake line leads to wheel brake cylinders, wherein at least one valve for blocking the brake line in an anti-skid control operation is incorporated into the brake line, and communicating with the brake line is at least one pressure chamber, formed by an additional piston (24, 25), of a plunger (22) which is set under pressure for feeding brake fluid via a line, in which the brake line (15, 16) is upstream of the valve (18, 19, 20, 21), and a return line (33, 36) for the brake fluid upon anti-skid control leads to the pressure chamber (26, 28) of the plunger (22), an additional pressure chamber (52) is provided upstream of said additional piston (24, 25) of the plunger (22) into which pressure fluid is filled by means of a pump (46) via a feed line (51) and the pressure chamber (52) communicates via an equalization line (60) with an equalizing pressure chamber (59) upstream of the brake piston (3) in the master brake cylinder (1a).

17. A brake system as defined by claim 16, in which a 3/3-way (61) is incorporated into the equalization line (60).

18. A brake system comprising a master brake cylinder, in which at least one brake piston in said master brake cylinder forms a brake chamber and is acted upon with brake pressure by a piston rod (12a), from said chamber a brake line leads to wheel brake cylinders, wherein at least one valve for blocking the brake line in an anti-skid control operation is incorporated into the brake line, and communicating with the brake line is at least one pressure chamber, formed by an additional piston (24), of a plunger (22) which is set under pressure for feeding brake fluid via a line, in which the brake line (15) is upstream of the valve (20, 21), a return line (33) for the brake fluid upon anti-skid control leads to the pressure chamber (26) of the plunger (22), an additional pressure chamber (52) is provided upstream of said additional piston (24) of the plunger (22) into which pressure fluid is filled by means of a pump (46) via a feed line (51), the control of the pressure fluid supplied to the additional pressure chamber (52) from the pump (46) as well as from a reservoir (49) is effected mechanically via a 3/3-way valve (56) and a thrust rod (55) coupled to said additional piston (24) is connected to the piston rod (12a) via a connecting rod (57) and effects a mechanical actuation of the 3/3-way valve (56).

* * * * *